(12) United States Patent
Kim (10) Patent No.: US 9,921,389 B2
(45) Date of Patent: Mar. 20, 2018

(54) CAMERA MODULE HAVING A BALL (71) Applicant: MDPULSE CO., LTD., Gumi-si (KR)

(72) Inventor: Jin Kuk Kim, Cheonan-si (KR)

(73) Assignee: MDPULSE Co., Ltd., Gumi-si (KR)

( * ) Notice: Subject to any disclaimer, the term of this patent is extended or adjusted under 35 U.S.C. 154(b) by 169 days.

(21) Appl. No.: 15/048,059

(22) Filed: Feb. 19, 2016

(65) Prior Publication Data

US 2017/0205601 A1    Jul. 20, 2017

(30) Foreign Application Priority Data

Jan. 20, 2016 (KR) .................. 10-2016-0007293

(51) Int. Cl.
G03B 3/10 (2006.01)
G02B 7/09 (2006.01)
F16C 29/04 (2006.01)
F16C 33/32 (2006.01)
F16C 43/04 (2006.01)
G03B 13/36 (2006.01)

(52) U.S. Cl.
CPC ............ *G02B 7/09* (2013.01); *F16C 29/04* (2013.01); *F16C 33/32* (2013.01); *F16C 43/04* (2013.01); *G03B 3/10* (2013.01); *G03B 13/36* (2013.01); *F16C 2370/20* (2013.01); *G03B 2205/0053* (2013.01)

(58) Field of Classification Search
CPC ............ G02B 7/02–7/10; G02B 27/64–27/648
See application file for complete search history.

(56) References Cited

U.S. PATENT DOCUMENTS

| | | | | |
|---|---|---|---|---|
| 7,595,947 B2* | 9/2009 | Lee | .................. | G02B 7/021 |
| | | | | 310/323.01 |
| 7,969,670 B2* | 6/2011 | Woo | .................. | G02B 7/102 |
| | | | | 359/822 |
| 8,086,099 B2* | 12/2011 | Schworm | .............. | F16C 19/08 |
| | | | | 396/144 |
| 8,248,722 B2* | 8/2012 | Hattori | ................ | G02B 7/021 |
| | | | | 359/827 |
| 8,594,494 B2* | 11/2013 | Jacobsen | ............. | H04N 5/2254 |
| | | | | 348/340 |
| 8,730,595 B2* | 5/2014 | Shikama | ............... | G03B 5/00 |
| | | | | 359/813 |
| 2008/0144201 A1* | 6/2008 | Koc | .................. | G02B 7/021 |
| | | | | 359/824 |

(Continued)

FOREIGN PATENT DOCUMENTS

| | | |
|---|---|---|
| KR | 10-2011-0031769 A | 3/2011 |
| KR | 10-2012-0032271 A | 4/2012 |
| KR | 10-2013-0059145 A | 6/2013 |

*Primary Examiner* — Bumsuk Won
*Assistant Examiner* — Jeffrey Madonna
(74) *Attorney, Agent, or Firm* — NSIP Law (57) ABSTRACT

A camera module is provided, the camera module including a mover mounted with a lens, a stator movably supporting the mover to an optical axis direction of the lens, and a ball interposed between the mover and the stator, wherein a first rail is provided on the mover to allow a relative movement of the ball to the mover to the optical axis direction, and a second rail is provided on the stator opposite to the first rail to allow a relative movement of the ball to the stator to the optical axis direction, and wherein the ball linearly travels along the optical axis direction when the mover and the stator relatively move.

11 Claims, 8 Drawing Sheets

(56) References Cited

U.S. PATENT DOCUMENTS

| | | | |
|---|---|---|---|
| 2009/0316284 A1* | 12/2009 | Kim | G02B 7/102 |
| | | | 359/824 |
| 2010/0091392 A1* | 4/2010 | Jung | G02B 7/08 |
| | | | 359/824 |
| 2012/0237147 A1* | 9/2012 | Utz | F16C 29/046 |
| | | | 384/49 |
| 2015/0103240 A1* | 4/2015 | Kim | G02B 7/08 |
| | | | 348/374 |
| 2015/0346453 A1* | 12/2015 | Cheong | H04N 5/2257 |
| | | | 359/824 |
| 2016/0299349 A1* | 10/2016 | Cho | G02B 27/646 |
| 2017/0141669 A1* | 5/2017 | Song | H02K 41/02 |

* cited by examiner

CAMERA MODULE HAVING A BALL

Pursuant to 35 U.S.C. §119 (a), this application claims the benefit of earlier filing date and right of priority to Korean Patent Application No. 10-2016-0007293, filed on Jan. 20, 2016, the contents of which are hereby incorporated by reference in their entirety.

BACKGROUND OF THE DISCLOSURE

Field

The teachings in accordance with the exemplary embodiments of this present disclosure generally relate to a camera module having a ball interposed between a mover and a stator that are mutually and relatively moved, and a manufacturing method thereof.

Background

The recent market trend of mobile phone industries has changed in its aspect due to competitiveness of control technologies for realizing an accurate image quality while being increased in the number of pixels. A compact digital camera module differentiated to have a high resolution requires an auto focusing function in order to realize an accurate image quality despite being of small size.

Although the auto focusing function is already generalized in the conventional digital cameras, it is still difficult to realize the auto focusing function in a compact digital camera module miniaturized in terms of length/breadth size to within several mm. In order to realize the auto focusing function in a compactly miniaturized camera module, a renovating improvement in a driving mechanism including an actuator is required.

Furthermore, low power consumption for auto focusing adjustment function is important in a small device using a power such as a battery.

Korea registered patent publication No. 0649490 discloses a solenoid type actuator of latch method, but fails to teach a method to reduce the power consumption in relation to a ball, and a ball assembly method.

CITED REFERENCE DOCUMENT

[Patent Document] Korea Registered Patent Publication No. 0649490

SUMMARY OF THE DISCLOSURE

The present disclosure is provided to a camera module easy in manufacturing and drivable with low power consumption.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a camera module, comprising:
a mover mounted with a lens;
a stator movably supporting the mover to an optical axis direction of the lens; and
a ball interposed between the mover and the stator, wherein, a first rail is provided on the mover to allow a relative movement of the ball to the mover to the optical axis direction, and a second rail is provided on the stator opposite to the first rail to allow a relative movement of the ball to the stator to the optical axis direction, and wherein, the ball linearly travels along the optical axis direction when the mover and the stator relatively move.

In another general aspect of the present disclosure, there is provided a method for manufacturing a camera module, the method comprising: inclining an assembly to allow an extended direction of a rail formed between a mover installed with a lens and a stator movably supporting the mover to be parallel with a ground surface, when the assembly of mutually and relatively moving mover and stator is provided; aligning a ball at an entrance of rail maintaining a state parallel with a ground surface; and moving the ball and inserting the ball into the entrance of the rail along the extended direction of the rail.

ADVANTAGEOUS EFFECTS

The camera module according to the present disclosure may include a ball interposed between a mover and a stator to be roll-contacted to each of the mover and the stator. The ball may include a light-weighted ceramic material compared with a metal to prevent the ball from free-falling by self-weight. Furthermore, lubricant may not be coated to allow the ball to roll-contact both the mover and the stator. According to the present disclosure, the ball maintains a non-lubricant state free from lubricant, whereby no foreign objects exist derivatively caused by the lubricant, and therefore, the ball can securely roll-contact because the ball is not slipped on the mover or the stator. Thus, according to the present disclosure, generation of foreign objects can be restricted due to the ball that is maintained with non-lubricant state. Furthermore, the power consumption can be improved by the ball including a ceramic material and moved through the roll-contact.

Still furthermore, a retainer constantly maintaining a gap between balls is provided according to the present disclosure to prevent generation of interference between balls and to improve the power consumption. In addition, a tilting phenomenon in which a mover is inclined to a stator can be prevented.

According to the present disclosure, a ball and a retainer can be inserted in a state in which a rail is horizontal to a ground surface, the rail being a passage of the ball and formed at the mover and the stator. Furthermore, the camera module according to the present disclosure may be provided with a jig unit configured to guide the movement of the ball and the retainer to a horizontal direction. According to the present disclosure, a user may use the jig unit to easily insert the ball and the retainer in a gap formed at the mover and the stator.

DETAILED DESCRIPTION OF THE DISCLOSURE

Exemplary embodiments of the present disclosure will be described in detail with reference to the accompanying drawings.

Features and advantages of the exemplary embodiments will be or will become apparent to one of ordinary skill in the art upon examination of the following figures and detailed description. In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. Furthermore, the term "when" may be construed to mean "if", depending on the context.

Figure 1:
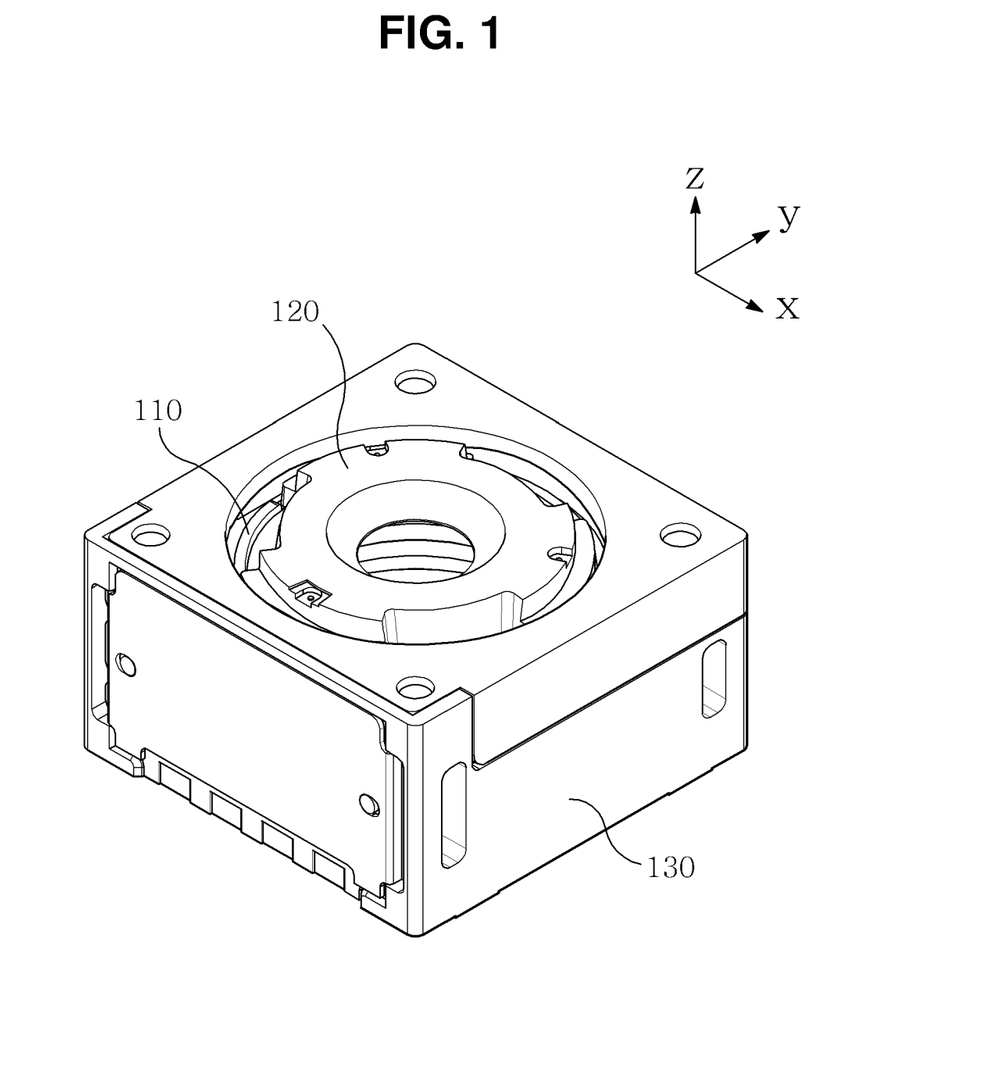
FIG. 1 is a schematic perspective view illustrating a camera module according to the present disclosure.
Figure 2:
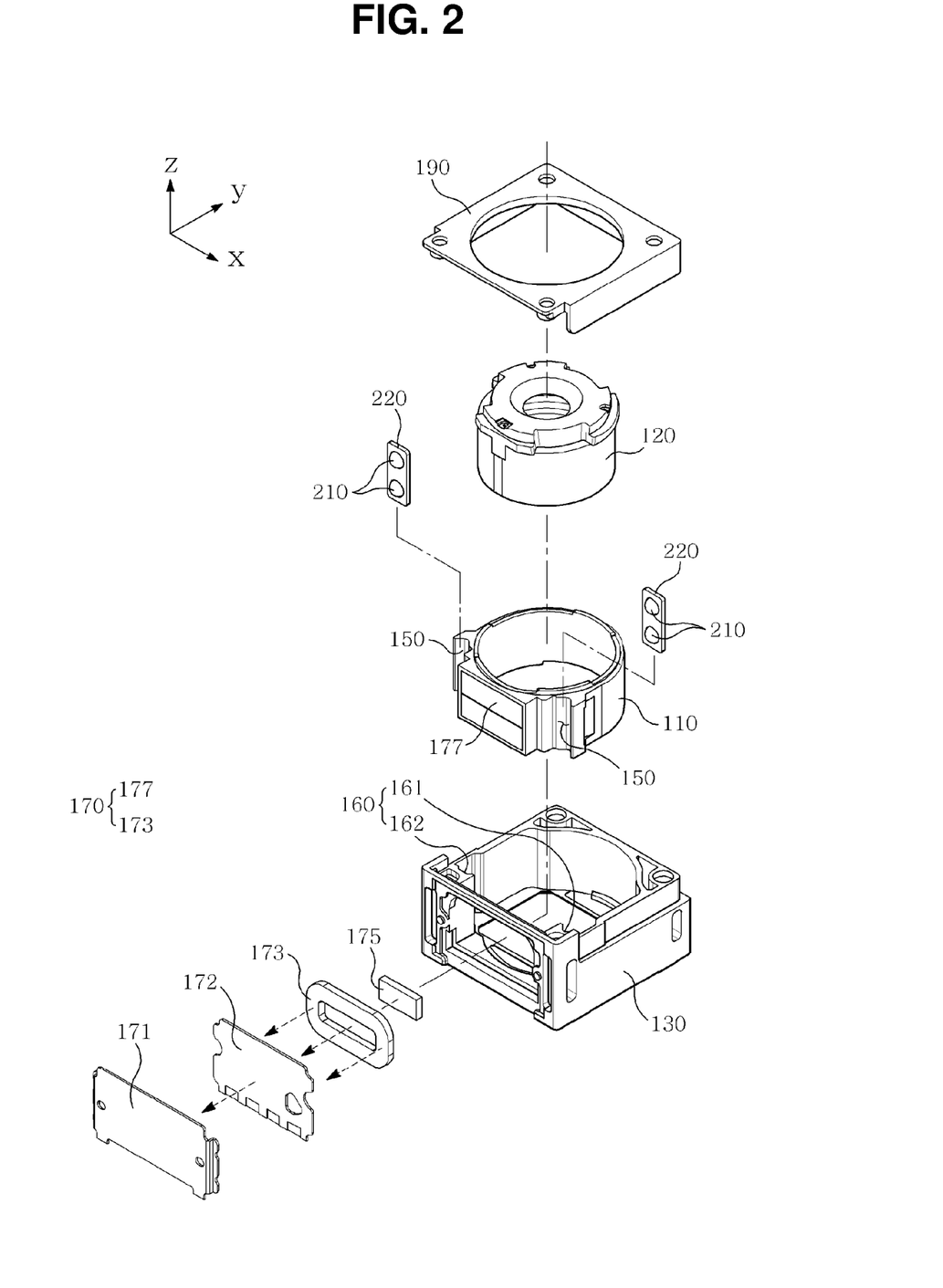
FIG. 2 is an exploded perspective view illustrating a camera module according to the present disclosure.

FIG. 1 is a schematic perspective view illustrating a camera module according to the present disclosure, and FIG. 2 is an exploded perspective view illustrating a camera module according to the present disclosure.

The illustrated camera module may include a moving part (hereinafter referred to as 'mover', 110), a stationary part (hereinafter referred to as 'stator', 130) and a ball (210).

The mover (110) may be fixedly mounted with a lens (not shown). When the lens is installed inside a body tube (120), the mover (110) may be fixedly installed with the body tube (120). In the present disclosure, the term of optical axis means an imaginary axis on which an optical image incident from a subject to a camera module advances, and the optical axis is z axis as illustrated in the drawings.

The stator (130) may be covered by a cover (190) in order to prevent foreign objects from coming into a camera module. The mover (110) may be moved toward an optical axis during auto focusing by a coil (173) and a magnet (177). The stator (130) may movably support the mover (110) to an optical axis direction of the lens. Movable support of the mover (110) to an optical axis direction using other means than an elastic member is advantageous to tilting restriction and low power.

The camera module according to the present disclosure may use a ball (210) in order to reduce power consumption for moving the mover (110) to the optical axis direction and to prevent an inclined tilt. The ball (210) may be interposed between the mover (110) and the stator (130). A plurality of balls (210) may be provided each at a different position along an optical axis direction (z axis direction) to prevent a horizontal tilting in which the mover (110) is inclined to a horizontal direction perpendicular to an optical axis.

A plurality of balls (210) may be provided each at a different position along a horizontal direction (x axis direction) to prevent a horizontal tilting in which the mover (110) is inclined to a horizontal direction perpendicular to an optical axis. Rails (150, 160) may be formed between the mover (110) and the stator (130) on which the ball (210) travels.

To be more specific, a rail is configured in a manner such that a first rail (150) provided at the mover (110) and a second rail (160) provided at the stator (130) may be formed by being oppositely arranged. The first rail (150) may be so formed as to allow the ball (210) to be relatively moved relative to the mover (110) to the optical axis direction. For example, the first rail (150) may include a groove formed at one surface of the mover (110) opposite to the stator (130) and extended along the optical axis direction. The ball (210) may roll-contact the first rail (150) when the mover (110) and the stator (130) are relatively moved and may be relatively moved to the mover (110).

The second rail (160) may be so formed as to permit a relative movement of the ball (210) relative to the stator (130) to the optical axis direction. For example, the second rail (160) may include a groove formed at one surface of the stator (130) opposite to the first rail (150) and extended along the optical axis direction. The ball (210) may roll-contact the second rail (160) when the mover (110) and the stator (130) are relatively moved, and may be relatively moved to the stator (130).

According to the first rail (150), the second rail (160) and the ball (210), the mover (110) and the stator (130) may be guided to the roll-contact of the ball (210) interposed between the mover (110) and the stator (130) and may be relatively moved to the optical axis direction. Because the relative movement is realized through the roll-contact, power consumption can be improved necessary for relative movement between the mover (110) and the stator (130).

According to the present disclosure, the ball (210) is not fixed to a particular position of the mover (110) on the optical axis direction, and is not fixed to a particular position of the stator (130), either. Thus, the ball (210) may free-fall along the rail due to self-weight, when the suction force attracting or pushing the mover (110) toward the stator (130) decreases.

It is preferable that the ball (210) be lightly formed as possible as can be within an allowable durability scope in order to prevent the sliding contact of being slid on the first rail (150) or the second rail (160) by self-weight while not being roll-contacted to the rail. Thus, the metal as a material of ball (210) may be ruled out. Furthermore, the ball (210) prefers to have a greater sliding friction power than a metal.

For example, the material of ball (210) is a non-metal material. The material of ball (210) may be synthetic resin or a ceramic having a same level of strength and durability as that of the metal material while specific gravity is by far small. The ball (210) may be a ceramic among the non-metal materials. The non-metal materialed or ceramic materialed ball (210) may have a higher strength and higher durability over the synthetic resin material. Furthermore, the non-metal materialed or ceramic materialed ball (210) may have a surface roughness capable of preventing slippage with each rail while being sufficiently light over the metal. When lubricant is added on the surface of the ball (210), the ball (210) may slip on each rail due to lubricant, even if the ball (210) is formed with a ceramic material. Thus, it is preferable that non-lubricant roll-contact state of no separate addition of lubricant be maintained between the first rail (150) and the ball (210) and between the second rail (160) and the ball (210).

According to non-lubricant state, the roll-contact between the first rail (150) 무윤활 and the ball (210) and roll-contact between the second rail (160) and the ball (210) can be positively guaranteed. Furthermore, the phenomenon of the camera module being damaged by the lubricant acting as foreign object can be positively prevented.

Here, a relevant horizontal direction is defined as a first direction (x axis direction), when the ball (210) is installed at a plurality of positions to a horizontal direction perpendicular to the optical axis, and a direction perpendicular to an optical axis and to the first direction is defined as a second direction (y axis direction).

The camera module according to the present disclosure may be provided with a suctioner that sucks in the mover (110) to the stator (130) along the second direction. The mover (110) and the stator (130) may be mutually contacted by the suction force of the suctioner, such that the free-fall phenomenon of the ball (210) by the self-weight can be prevented.

For example, the suctioner may be provided with a yoke (171) installed at the stator (130). The yoke (171) may include a magnetic substance acted with attractive force of a magnet (177) included in an actuator (170). The mover (110) installed with the magnet (177) may be pulled toward the stator (130) installed with the yoke (171) by the attractive force acting between the yoke (171) and the magnet (177).

The yoke (171) may form a wall surface at one side of the stator (130). The yoke (171) may be formed in a leaf shape. A substrate (172) may be installed at one surface of the yoke (171) opposite to the mover (110). The substrate (172) may be installed with a coil (173) forming the actuator (170). A through hole may be formed at a center of the coil (173) wound in a closed curve shape with an electric-conducting wire. A Hall sensor (175) to detect changes in magnetic field may be installed at a center of the through hole.

The changes in the magnetic field detected by the Hall sensor (175) may be used to grasp a relative position of the mover (110) to the stator (130).

Figure 3:
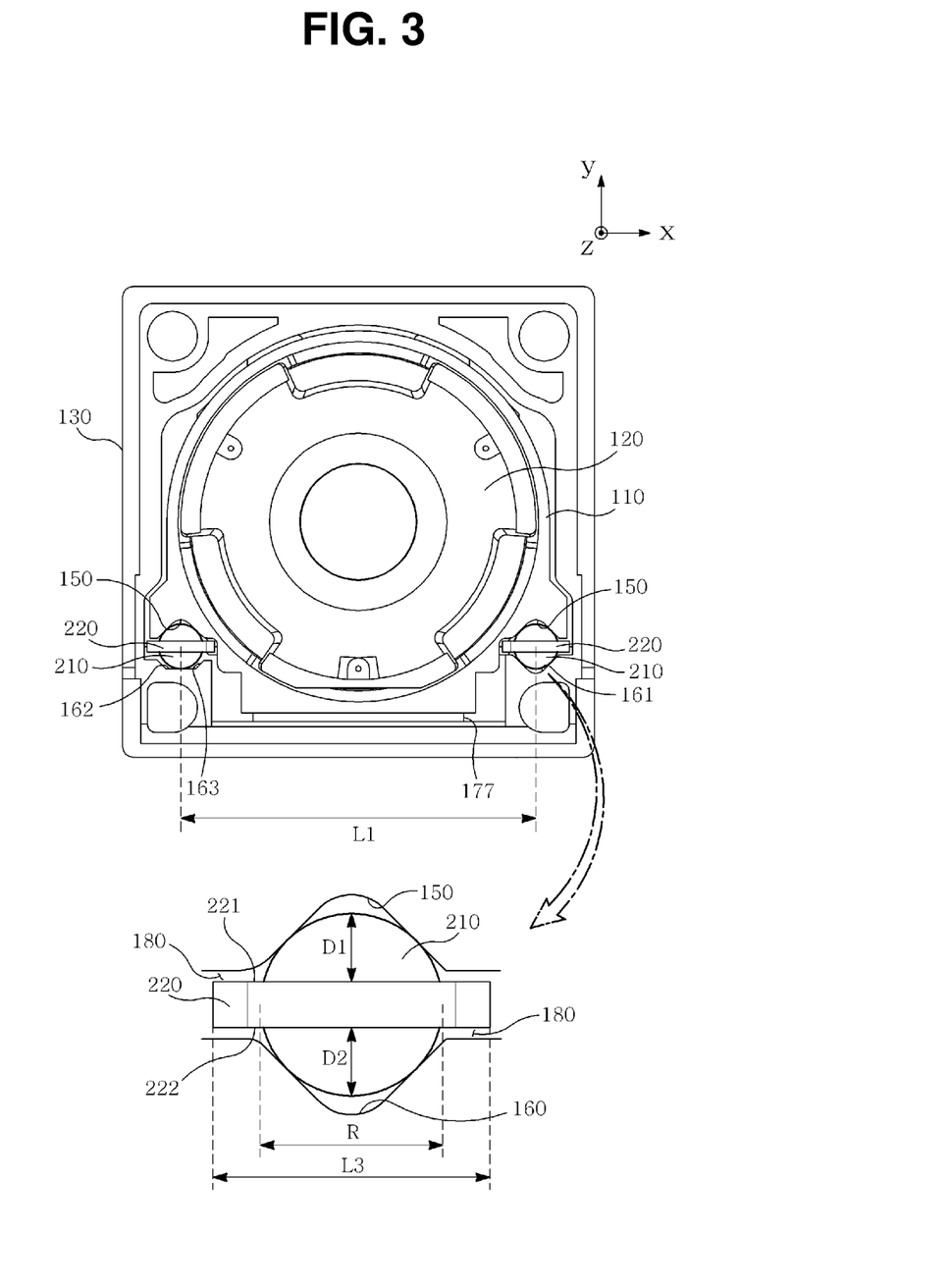
FIG. 3 is a plan view illustrating a camera module according to the present disclosure.

FIG. 3 is a plan view illustrating a camera module according to the present disclosure, where a plan view ruled out of a cover (190) is illustrated.

A plurality of balls (210) may be arranged at mutually different positions to the first direction (x axis direction). At this time, the mover (110) may be formed with a plurality of first rails of 'V' grooved shape into which a part of each ball (210) is accommodated, in order to constantly maintain a gap between the plurality of balls (210) to the first direction. The first rail (150) formed at mutually different positions to the first direction can maintain a constant gap by a body forming the mover (110). Thus, L1, which is a distance of a center of the ball (210) accommodated into the 'V' shaped groove can be constantly maintained.

One surface of the stator (130) opposite to the first rail (150) may be formed0∥에 대 with a second rail (160). The second rail (160) is configured such that unlike the first rail (150), only one first groove (161) may be formed with a 'V' grooved shape, and a remaining second groove (162) may be formed with '1' grooved shape.

When a plurality of second rails (160) is formed with 'V' grooved shape, a gap between grooves at the first rail (150) side and a gap between grooves at the second rail (160) side may not be completely matched in reality and may be but being different. Thus, when it is imagined that the ball (210) is completely inserted into the 'V' shaped groove at the first rail (150) side, and when one of the plurality of balls (210) is completely inserted into a particular 'V' shaped groove at the second rail (160) side, the remaining ball (210) cannot be completely inserted into the other 'V' shaped groove at the second rail (160) side and may be in a slightly hitched state on an edge of a relevant groove. As a result, a rotational tilt in which the mover (110) is rotated about the optical axis may be generated.

Meantime, the rotational tilt can be prevented when only one groove out of grooves at the second rail (160) side is formed with 'V' shaped groove, as in the present disclosure, and remaining groove is formed with '1' shaped groove.

Both sides of the '1' shaped groove may be formed with a slope (163) inclined to the '1' shaped groove, in order to prevent the ball (210) from being detached by external shock from the second rail (160) of '1' grooved shape. The slope (163) may function as a hitching sill that restricts the movement of ball (210) moving to the first direction.

A plurality of balls (210) may be arranged at mutually different positions to the optical axis direction (z axis direction). The plurality of balls (210) arranged at mutually different positions to the optical axis direction may be inserted into one first rail (150) or one second rail (160).

When a plurality of balls (210) inserted into the same rail is mutually contacted, the roll contact to the mover (110) or to the stator (130) may be obstructed. Furthermore, when a gap between the plurality of balls (210) inserted into the same rail is changed at every time, an inclined tilt may be generated in which the mover (110) is inclined to the optical axis. A retainer (220) may be provided to the camera module of the present disclosure in order to prevent the contact between each ball (210) and the inclined tile.

Figure 4:
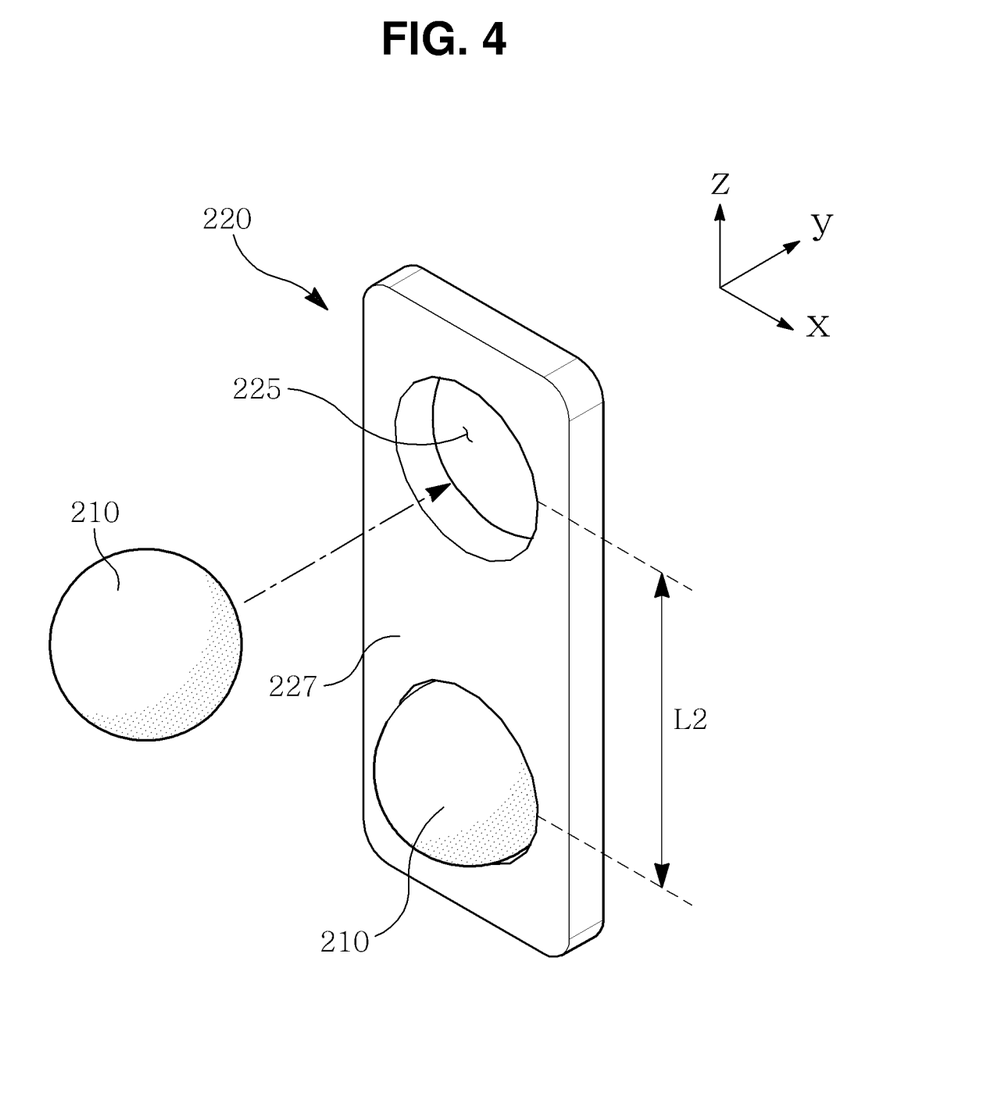
FIG. 4 is a schematic view illustrating a retainer included in a camera module according to the present disclosure.

FIG. 4 is a schematic view illustrating a retainer (220) included in a camera module according to the present disclosure.

The retainer (220) can constantly maintain a distance between plurally arranged balls (210) along an optical axis direction. The retainer (220) may be provided with a supporter (225) and a connector (227).

The supporter (225) may be formed at mutually different positions to the optical axis direction to rotably support each ball (210). For example, the supporter (225) may include a hole into which the ball (210) can piercingly inserted. The ball (210) roll-contacting the mover (110) or the stator (130) may slide-contact the supporter (225). According to the present disclosure, no separate lubricant is added to the ball (210), such that it is preferable to have less frictional force between the ball (210) and the supporter (225).

In order to reduce the frictional force between the ball (210) and the supporter (225), material of the supporter (225) may include a lubricant synthetic resin having a smooth surface. In order to secure prevention of foreign objects and constant roll-contact using the same frictional characteristics, at least one of the retainer (220), the stator (130) and the mover (110) may be manufactured with a synthetic resin material.

The connector (227) can connect a plurality of supporters (225). At this time, a distance L2 of center at each ball (210) installed at the supporter (225) can be constantly maintained by the connector (227).

In order to exercise a stable guide, the retainer (220) may be formed longer than a diameter of the ball (210) to at least one direction of the optical direction, the first direction perpendicular to the optical direction and the second direction perpendicular to the first direction. The retainer (220) may be formed longer than a diameter of the ball (210) to a horizontal direction perpendicular to the optical axis of the lens. At this time, the ball (210) may be installed between both distal ends of the retainer (220).

The retainer (220) may be inserted between the mover (110) and the stator (130) along with the ball (210), in order to constantly maintain a gap of each ball (210) traveling on the first rail (150) or the second rail (160). To be more specific, a distal end of the retainer (220) may be inserted into the separator (180) in order to slide along the optical axis direction. At this time, the separator (180) may include a gap formed between the mover (110) and the stator (130).

Returning to FIG. 3, the separator (180), corresponding to a groove into which the retainer (220) is inserted, may be provided on at least one of the mover (110) and the stator (130).

When a horizontal direction perpendicular to the optical axis of the lens is defined, the separator (180) may be extended along the horizontal direction from the first rail (150) or from the second rail (160). Furthermore, the separator (180) may be extended to the optical axis direction, in order to allow the inserted retainer (220) to travel along the optical axis direction.

Both distal ends of the retainer (220) may be slidably inserted into the separator (180). The ball (210) may be installed opposite to the first rail (150) or to the second rail (160) between the both distal ends of the retainer (220). When the mover (110) and the stator (130) implement a relative movement, the retainer (220) may slide on the separator (180) and linearly travel along the optical axis direction along with the ball (210).

A length L3 of retainer (220) to the first direction (x axis direction) perpendicular to the optical axis of lens may be formed longer than a diameter R of the ball (210). At this time, a distal end of the retainer (220) to the first direction may be inserted into the separator (180) corresponding to the gap between the mover (110) and the stator (130).

The retainer (220) may be arranged at a center of the ball (210) along the first direction (x axis direction) perpendicular to the optical axis direction (z axis direction) or the second direction (y axis direction) perpendicular to the first direction. Thus, the travelling ball (210) can be prevented from being leant to one direction, and prevented from generating a rotational moment of different direction other than the linear traveling direction of the ball (210), whereby travelability to a linear direction at the ball (210) can be improved.

A first surface (221) opposite to the first rail (150) and a second surface (222) opposite to the second rail (160) may be defined on the retainer. At this time, a distance D1 from the first surface (221) to a distal end at one side of the ball (210) and a distance L2 from the second surface (2220 to a distal end at the other side of the ball (210) may be constantly maintained by the separator (180).

A diameter of the supporter (225) may be same as a diameter R of the ball (210). At this time, when the retainer (220) is arranged at the center of the ball (210) to the second direction, the ball (210) can be prevented from moving inside the supporter (225).

Figure 5:
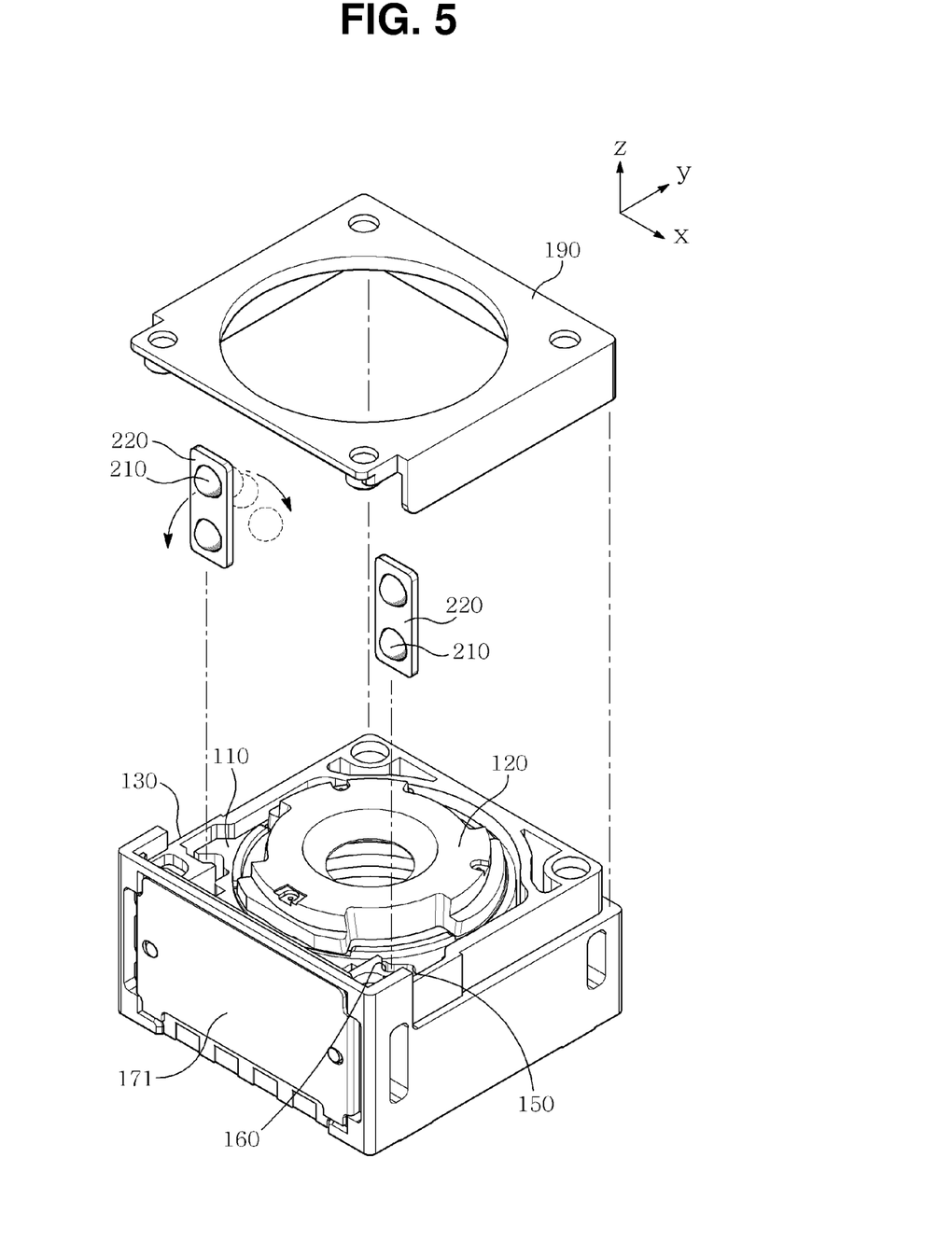
FIG. 5 is a schematic view illustrating an assembly process of a camera module according to the present disclosure.

FIG. 5 is a schematic view illustrating an assembly process of a camera module according to the present disclosure.

When the ball (210) and the retainer (220) are inserted between the mover (110) and the stator (130), an entrance to the first rail (150) and to the second rail (160) extended to the optical axis direction may be covered by a cover (190). The plurality of balls (210) may be installed across the retainer (220) to the optical axis direction.

The retainer (220) moves with the ball (210) along the optical axis direction, whereby the retainer (220) can be prevented from the mover (110) or the stator (130) by the cover (190). To be more specific, an upper distal end of the retainer (220) moving toward the cover (190) side cannot be deviated to the outside due to blockade of the cover (190). When the retainer (220) is prevented from being deviated, the ball (210) supported by the retainer (220) can be also prevented from being deviated from the first rail (150) or the second rail (160).

However, it is very difficult to support the ball (210) on the retainer (220) while the retainer (220) is vertically erected on a ground surface. This is because the ball (210) flows down by being deviated from the supporter (225) of the retainer (220) by self-weight.

Figure 6:
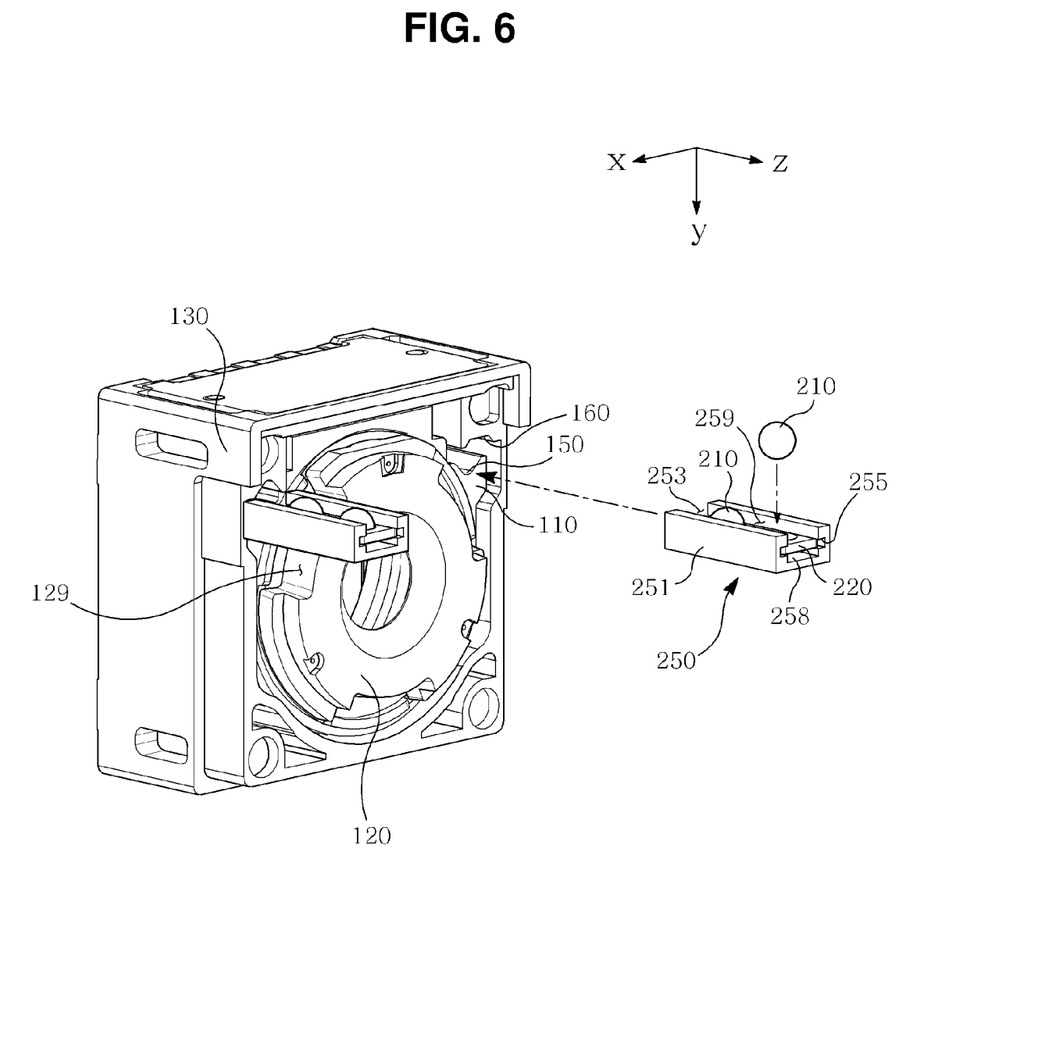
FIG. 6 is a schematic view illustrating another camera module according to the present disclosure.

FIG. 6 is a schematic view illustrating another camera module according to the present disclosure.

The camera module according to the present disclosure may be provided with a jig unit (250), in order to easily insert the ball (210) between the first rail (150) and the second rail (160).

The jig unit (250) may include a body (251) formed with an accommodation space (259) to accommodate the ball (210) and the retainer (220), and an opening (253) exposed by the accommodation space (259).

While the stator (130) is installed with the mover (110), the opening (253) of the jig unit (250) may be aligned at the entrance of the first rail (150) or the second rail (160). When the opening (253) of the jig unit (250) is aligned at the entrance of the rail, the ball (210) and the retainer (220) accommodated into the body (251) of the jig unit (250) are extracted from the opening (253) and may be inserted between the first rail (150) and the second rail (160).

In order for the ball (210) to be easily inserted using the jig unit (250), the first rail (150), the second rail (160) and the body (251) of the jig unit (250) may be arranged in parallel on the ground surface as illustrated in FIG. 6.

When the extended directions of the first rail (150), the second rail (160) and the body (251) are aligned in the same manner, the ball (210) and the retainer (220) slide along the body (251), and may be extracted to the opening (253). The ball (210 and the retainer (220) extracted from the opening (253) may be inserted into the entrance of the first rail (150) or the second rail (160) aligned at the opening 부 (253).

When the body (251) is arranged in parallel with the ground surface, the jig unit (250) and the ball (210) accommodated into the body (251) are prevented from free-falling and from flowing down the body (251) and may stick to the installed position.

When the first rail (150) and the second rail (160) are extended to a third direction, the plurality of balls (210) and the retainer (220) constantly maintaining a gap between each ball (210) to the third direction may be accommodated into the accommodation space (259) of the body (251).

The body (251) may be provided with an inserter (255) formed at the wall part forming the accommodation space (259). The inserter (255) is a groove into which a distal end of the retainer (220) is slidably inserted, and may be extended to the third direction.

When a fourth direction perpendicular to the third direction is defined, the inserter (255) may align the retainer (220) at an installation position to the fourth direction. To this end, the inserter (255) may be distanced from a floor (258) of the body (251) to the fourth direction.

When the opening (253) is aligned at the entrance of the rail, the retainer (220) aligned at the installed position may be matched to the separator (180) provided at both sides of the first rail (150) of the second rail (160).

The retainer (220) may be extracted from the opening (253) and may be inserted into the separator (180). At this time, the ball (210) may be inserted into the first rail (150) or into the second rail (160) positioned at between both sides of separator (180).

Figure 7:
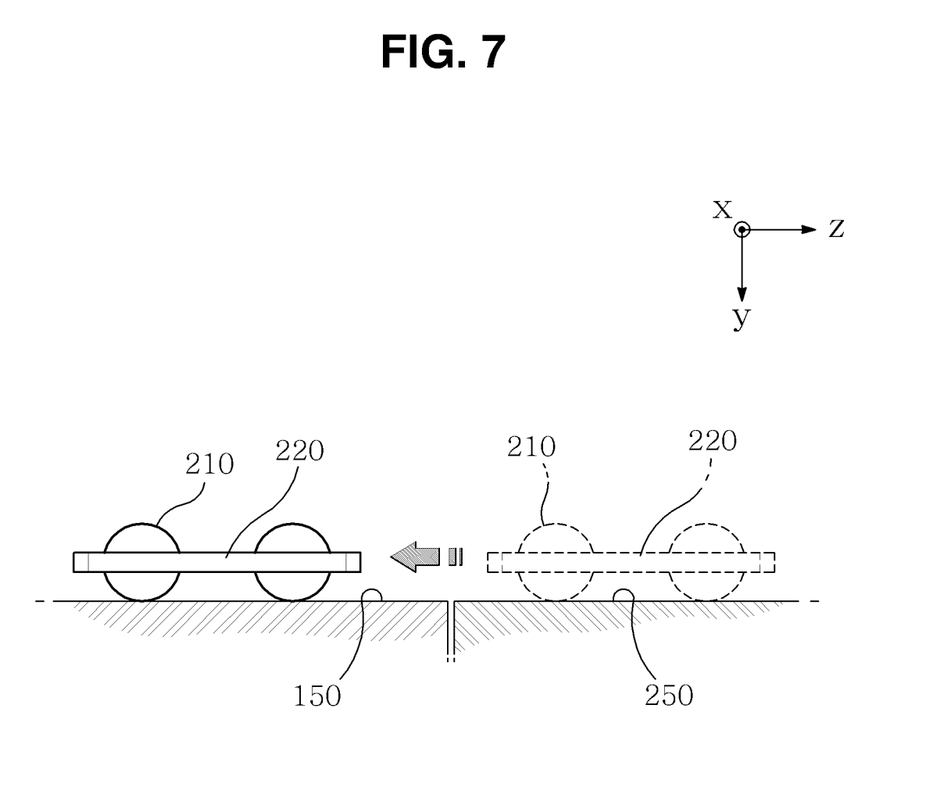
FIG. 7 is a schematic view illustrating a process of a ball being inserted into a rail according to the present disclosure.

FIG. 7 is a schematic view illustrating a process of a ball (210) being inserted into a rail according to the present disclosure.

When the first rail (150), the second rail (160) and the body (251) are arranged in parallel on the ground surface, the ball (210) may be supported to the floor (258) of the body (251) extended in parallel to the ground surface. Thus, the ball (210) can be prevented from free-falling by self-weight, and can be also prevented from moving to the left and to the right.

When a user extracts the ball (210) from the opening (253) by horizontally pushing the ball (210), the ball (210) extracted from the opening (253) may be inserted into the entrance of the rail aligned at the opening (253). A measure to easily align the opening (253) of the jig unit (250) at the entrance of rail may be provided.

Figure 8:
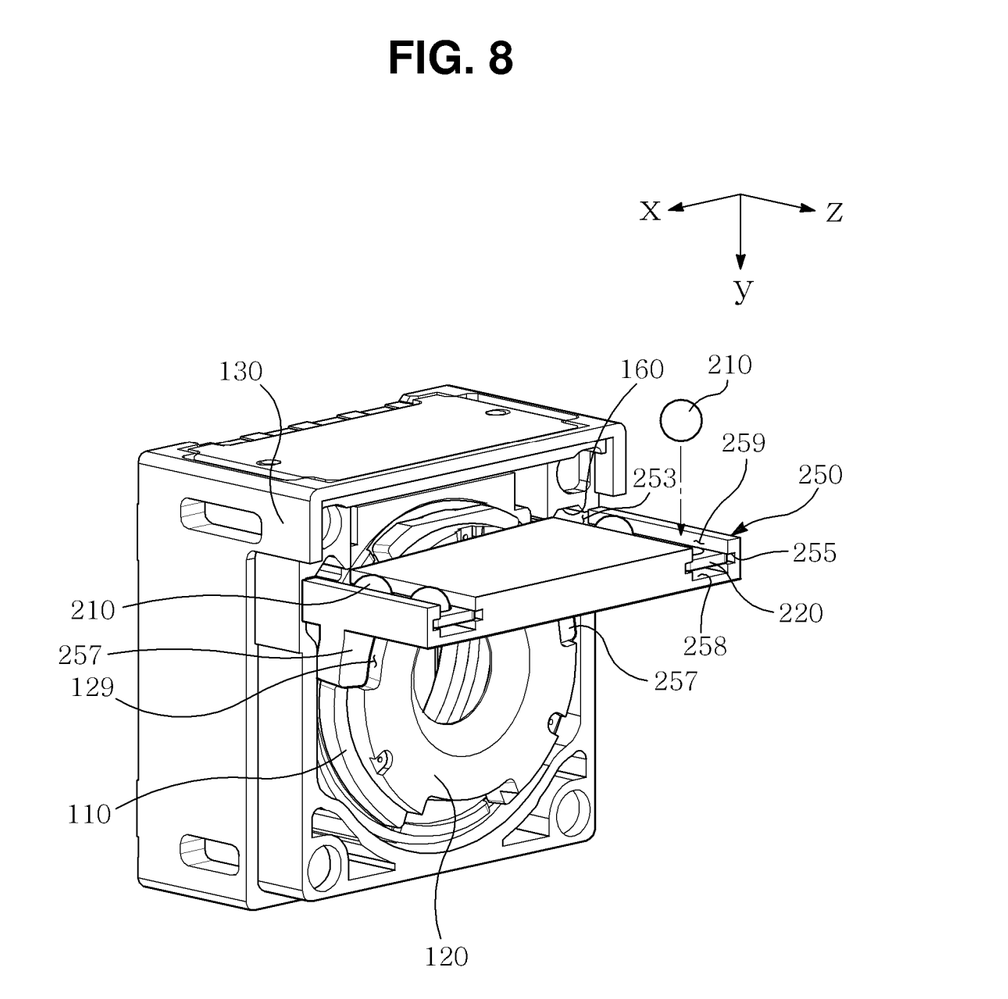
FIG. 8 is a schematic view illustrating a still another camera module according to the present disclosure.

FIG. 8 is a schematic view illustrating a still another camera module according to the present disclosure.

A plurality of bodies (251) formed with the accommodation space (259) to accommodate the ball (210) and the retainer (220) may be provided on the jig unit (250) at mutually different positions. At this time, each body (251) may be formed at the same gap as that of the plurality of first rails (150) each provided at a different position. Thus, the plurality of bodies (251) can be aligned on the plurality of first rails (150) through one time process of aligning the jig unit (250) at the entrance of rail.

Furthermore, the jig unit (250) may be provided with an installer (257) inserted into an insertion groove (129) formed at the tube body (120) installed at the mover (110).

When the installer (257) is inserted into the insertion groove (129), each body (251) may be naturally aligned on the first rail (150) or on the second rail (160).

Furthermore, when the tube body (120) is installed on the mover (110) by screw-connecting method, the rotational position of the tube body (120) may be aligned on the designed position by the installer (257).

Now, the method of manufacturing a camera module according to the present disclosure will be described.

The mutually and relatively moving mover (110) and the stator (130) may be first assembled.

The mover (110) and the stator (130) may be inclined in order for the extended direction of rail formed between the mover (110) mounted with a lens and the stator (130) movably supporting the mover (110) to be placed in parallel with the ground surface.

When the ball (210) is aligned at the entrance of rail maintained in parallel state with the ground surface and the ball (210) is moved along the extended direction of rail, the ball (210) can be inserted into the rail.

To be more specific, the rail can be extended along the optical axis direction of lens. The mover (110) and the stator (130) can maintain an inclined state to allow the extended direction of rail to be in parallel with the ground surface.

A jig unit (250) accommodated with the retainer (220) to constantly maintain a plurality of balls (210) and gap of each ball (210) may be provided.

The jig unit (250) may be provided with a body (251) formed with the accommodation space (259) accommodated by the ball (210), an opening (253) formed at at least one side of the body (251) and exposed by accommodation space (259), and an inserter (255) formed at the wall part forming the accommodation space (259) at the body (251) and inserted by a distal end of the retainer (220).

The retainer (220) may be provided with a leaf-shaped connector (227), and a supporter (225) formed at the connector (227) and piercingly installed with the ball (210).

When a distal end of the connector (227) is inserted into the inserter (255) of jig unit (250) while the jig unit (250) is arranged in parallel with the ground surface, and when the supporter (225) is placed opposite to the floor (258) of the body (251), the ball (210) can be installed on the supporter (225). According to the present process, the ball (210) can be inserted into the retainer (220) after the retainer (220) is first installed at the jig unit (250).

The ball (210) installed at the supporter (225) may slide contact the supporter (225) and roll contact the floor (258) of the body (251).

When the extended direction of jig unit (250) is aligned in the same way as the rail, and the opening (253) of the jig unit (250) is aligned at the entrance of rail, the retainer (220) inserted into the inserter (255) of the jig unit (250) may be slid and inputted into the rail.

The ball (210) is inputted into the rail along with the retainer (220), and a gap with other balls (210) within the rail can be constantly maintained by the retainer (220).

The foregoing has mainly explained a case where the mover (110) moves along an optical axis direction relative to the stator (130), but the present disclosure is not limited to the present exemplary embodiments, and may be applied to a case where the mover (110) moves along a horizontal direction perpendicular to the optical axis relative to the stator (130).

Although the camera module has been described and explained according to exemplary embodiments, the present disclosure is not limited to a particular exemplary embodiment but many alternatives, modifications, and variations will be apparent to those skilled in the art within the metes and bounds of the claims.

Therefore, it should be understood that the above-described embodiments are not limited by any of the details of the foregoing description, unless otherwise specified, but rather should be construed broadly within the scope as defined in the appended claims.

What is claimed is:
1. A camera module, comprising:
a mover mounted with a lens;
a stator movably supporting the mover to an optical axis direction of the lens;
a ball interposed between the mover and the stator;
a retainer configured to constantly maintain a distance between plurally aligned balls along the optical axis direction; and
a jig unit including a body formed with an accommodation space to accommodate the ball and the retainer, wherein,
a first rail is disposed on the mover to allow a relative movement of the ball to the mover to the optical axis direction,
a second rail is disposed on the stator opposite to the first rail to allow a relative movement of the ball to the stator to the optical axis direction,
the ball linearly travels along the optical axis direction in response to a relative movement between the mover and the stator, the ball is made of a non-metal material,
the mover and the stator are made of synthetic resin material,
an opening is exposed by the accommodation space,
the ball accommodated into the body of the jig unit and the retainer is inserted into the first rail or the second rail, in response to the opening of the jig unit being aligned at the entrance of the first rail or the second rail, and
the accommodation space of the body is accommodated with a plurality of balls and the retainer constantly maintaining a gap between each ball to a third direction in response to the first rail and the second rail being extended to the third direction, the body comprises and inserter, the inserter includes a groove formed at a wall part forming the accommodation space and slidably inserted by a distal end of the retainer, the inserter aligns the retainer at a predetermined position to a fourth direction in response to the fourth direction being perpendicular to the third direction, the retainer aligned on the predetermined position is matched to a separator provided at both sides of the first rail of the second rail, the retainer is inserted into the separator while being extracted from the opening, and the ball is inserted into the first rail or the second rail positioned between the separators.

2. The camera module of claim 1, wherein the ball includes a ceramic material in order to prevent the ball from performing a sliding contact in which the first rail or the second rail slides by self-weight of the ball.

3. The camera module of claim 1, wherein, the retainer comprises a plurality of supporters each formed at a different position to the optical axis direction to rotably support each of the aligned balls, and a connector connects the plurality of supporters, and wherein a distance between each of the aligned balls mounted on the supporter is constantly maintained by the connector.

4. The camera module of claim 1, wherein, the retainer is lengthily formed longer than a diameter of the ball to a horizontal direction perpendicular to the optical axis of the lens, and the distal end of the retainer is inserted into a gap slidably formed between the mover and the stator to the optical axis direction.

5. The camera module of claim 1, wherein, either one of both of the mover and the stator is provided with the separator corresponding to the groove inserted by the retainer, and wherein, the separator is extended along a horizontal direction from the first rail or from the second rail, when the horizontal direction is perpendicular to the optical axis of the lens, and wherein, each distal end of the retainer is inserted into the separator, and a ball is installed between the two distal ends of the retainer to face the first rail or the second rail, and the retainer is inserted into the separator to linearly travel along the optical axis direction along with the ball when the mover and the stator relatively move.

6. The camera module of claim 1, wherein, the retainer is lengthily formed at a length greater than a diameter of the ball to the optical axis direction of the lens, and the retainer is arranged at a center of the ball to the first direction and the second direction perpendicular to the optical axis direction.

7. The camera module of claim 1, wherein, a distance from a first surface to a distal end of one side of the ball and a distance from a second surface to a distal end of an other side of the ball are substantially equal, when the first surface is opposite to the first rail at the retainer and the second surface is opposite to the second rail.

8. The camera module of claim 1, wherein, the ball is installed across the retainer to the optical axis direction, an entrance of the first rail and the second rail is covered by a cover when the ball and the retainer are inserted between the mover and the stator, the retainer is moved along with the ball to the optical axis direction, the retainer is prevented from being detached from the mover or the stator by the cover, and the ball is prevented from being detached from the first rail or the second rail due to detachment prevention of the retainer.

9. The camera module of claim 1, wherein the first rail, the second rail and the body are arranged in parallel with a ground surface and the ball and the retainer are extracted to the opening while sliding along the body and inserted into the first rail aligned on the opening or the second rail.

10. The camera module of claim 1, wherein the jig unit is provided with a plurality of bodies each at a different position, and wherein, each body is formed at a same gap as that of each first rail when a plurality of first rails formed at the mover is provided each at a different position, and wherein, the jig unit is provided with an installer inserted into an insertion groove formed at a body tube installed at the mover, and each body is aligned at each first rail when the installer is inserted into the insertion groove.

11. A method for manufacturing a camera module, the method comprising: inclining a mover and a stator to allow an extended direction of a rail formed between the mover installed with a lens and the stator movably supporting the mover to be parallel with a ground surface, when the mutually and relatively moving mover and stator are assembled, wherein the rail is inserted by a ball while the ball is moved along the extended direction of the rail, the rail being extended along an optical axis direction of a lens, the mover and the stator maintain an inclined state to allow the extended direction of the rail to be parallel with the ground surface, a jig unit is accommodated by a retainer constantly maintaining a gap between balls, the jig unit includes a body formed with an accommodation space accommodated by the ball, an opening formed on one side of the body to expose the accommodation space, and an inserter formed at a wall part forming the accommodation space at the body and inserted by a distal end of the retainer, the retainer is provided with a leaf-shaped connector and a supporter formed at the connector to be piercingly installed with the ball, a distal end of the connector is inserted into the inserter of the jig unit and the ball is installed at the supporter, and wherein, the ball and the retainer are simultaneously inserted into the rail by sliding the retainer inserted into the inserter of the jig unit, in response to the opening of the jig unit being aligned at an entrance of the rail.

* * * * *